UNITED STATES PATENT OFFICE.

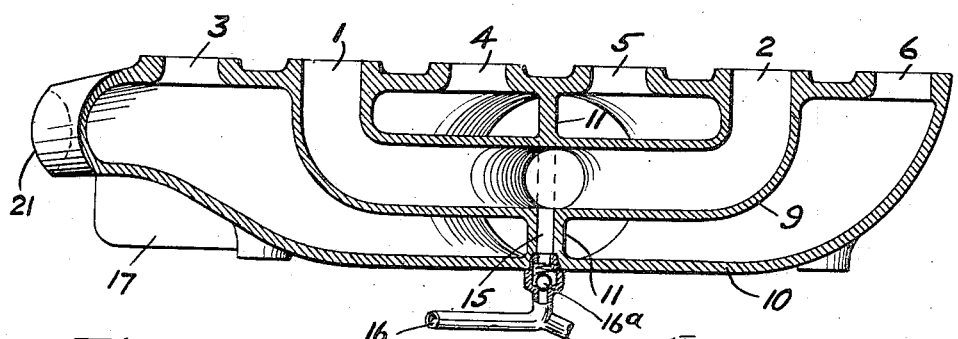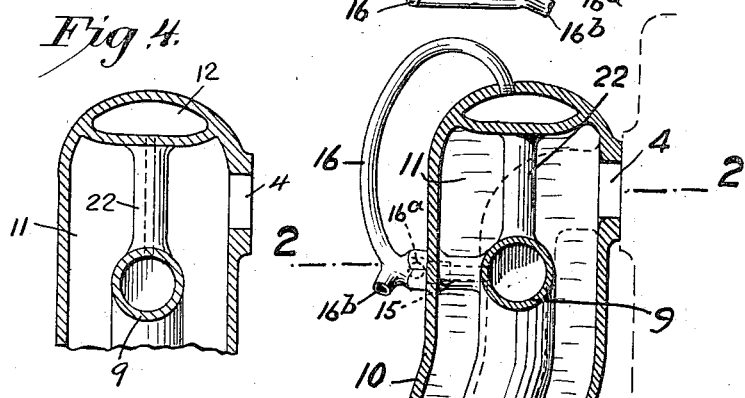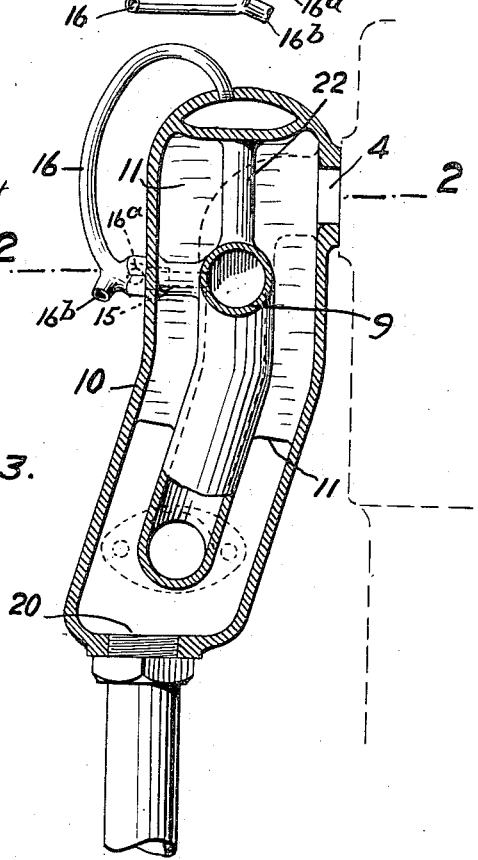

HAROLD E. MONTAGUE, OF PHILADELPHIA, PENNSYLVANIA, ASSIGNOR OF ONE-HALF TO EWALD A. FRITZE, OF PHILADELPHIA, PENNSYLVANIA.

INTERNAL-COMBUSTION ENGINE.

1,298,079.   Specification of Letters Patent.   Patented Mar. 25, 1919.

Application filed October 22, 1917. Serial No. 197,761.

*To all whom it may concern:*

Be it known that I, HAROLD E. MONTAGUE, a citizen of the United States, and a resident of Philadelphia, in the county of Philadelphia and State of Pennsylvania, have invented certain new and useful Improvements in Internal - Combustion Engines, of which the following is a specification.

The present invention relates to improvements upon the invention described and claimed in Letters Patent No. 1,227,551 of May 22nd, 1917, to the applicant, for improvements in internal combustion engines, and its principal object is to improve the results attained by the invention of said patent, especially in respect to the use of low grade fuel oils and in respect to the distribution and application of heat, while maintaining all the advantages incident to its use.

The improvements constituting the present invention will be claimed at the end hereof but will be first described in connection with the embodiment of it chosen from among other embodiments for the sake of illustration in the accompanying drawings in which—

Fig. 2, is a transverse sectional view, taken on the line 2—2 of Fig. 3.

Fig. 3, is a transverse sectional view of Fig. 1, and

Fig. 4, is a sectional view illustrating a modification.

Figure 1:
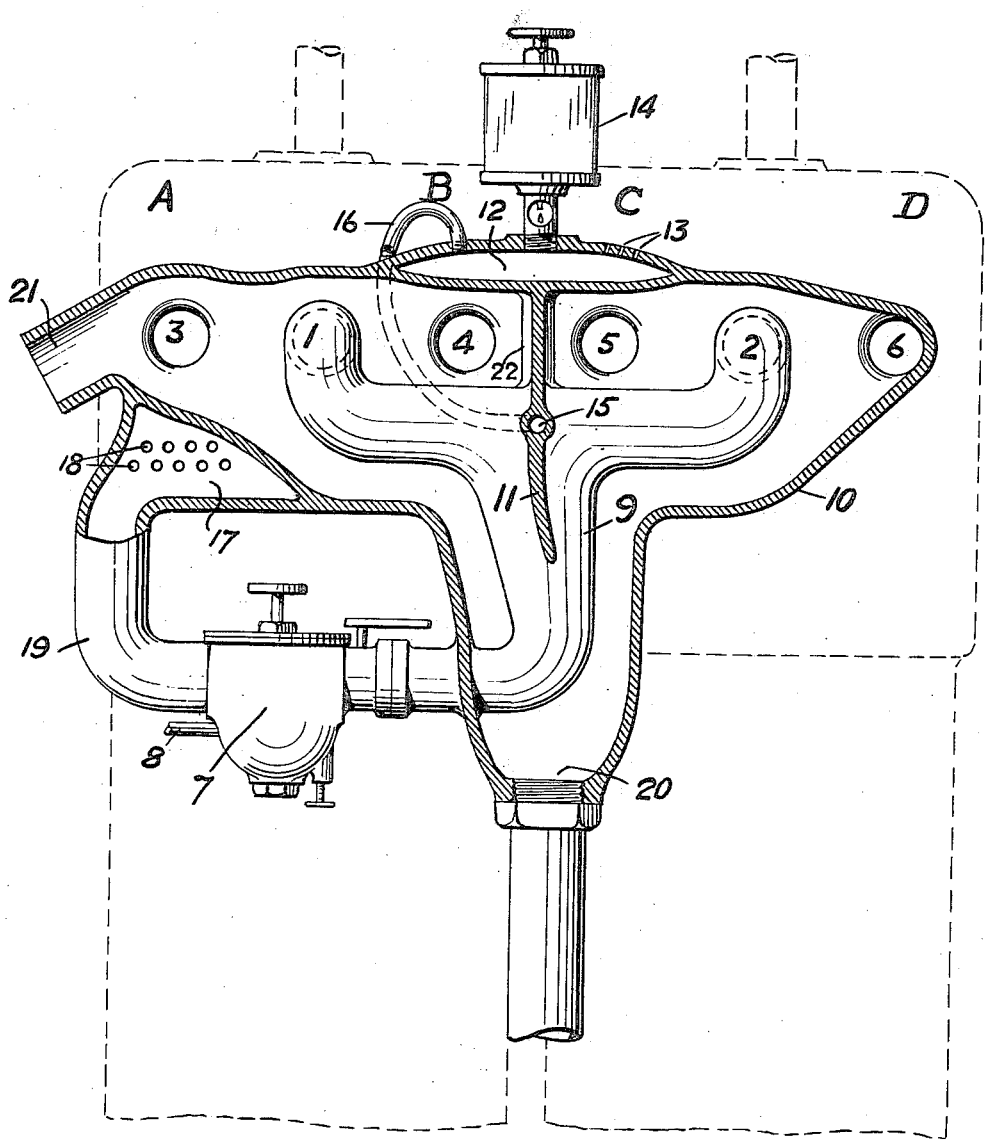
Figure 1, is an elevational view, principally in section.

In the drawings the cylinders of the gas engine are illustrated respectively at A, B, C and D and are illustrated as constructed in pairs. The inlet to the cylinders A and B is indicated at 1, and the inlet to the cylinders C and D is indicated at 2. The exhaust from the cylinder A is at 3, the exhaust from the cylinder B is at 4, the exhaust from the cylinder C is at 5, and the exhaust from the cylinder D is at 6. 7, is a carbureter to which liquid fuel is supplied as by a pipe 8 from some outside source. 9, is an elongated chamber communicating with the carbureter and with the inlet ports 1 and 2 of the engine. 10 is an exhaust compartment within which the chamber 9 is inclosed and which receives the exhaust gases from the engine at a plurality of ports 3, 4, 5, and 6, distributed along the chamber 9. In general the foregoing is a description of apparatus shown and described in the patent above referred to.

11 is a wall sub-dividing the upper part of the space between the outside of the chamber 9 and the inside of the compartment 10 and this wall extends from the top of the compartment 10 downward for somewhat more than half the height of the chamber, although the exact distance is not important. 12, is a steam generator on the wall of the compartment 10 and it is shown as provided with vents 13. 14, is a sight feed cup which may be employed for feeding water in regulated small quantities to the steam generator 12 upon which it is shown as mounted. The wall 11 is provided with a port 15 extending through it to the interior of the chamber 9 and this port is connected through a check valve 16ᵃ with the interior of the steam generator 12 as by a pipe 16, shown in Fig. 3, and indicated by dotted lines in Fig. 1, although the dotted portion would be removed in making the section but for clearness it is indicated. 17 is an air heater consisting of a cavity in the wall of the compartment 10 and to which air is supplied as by perforations 18 and from which air is delivered as by the connection 19 to the carbureter. The compartment 10 is provided with two exhaust openings 20 and 21, of which one is arranged at the bottom and the other at one side, or the other as may be most convenient in the assembly of the parts. One of these exhaust openings, for example, the opening 20 may be used as a cutout and the other, 21, used as an exhaust proper. However, this use may be inverted, if desired. The wall 11 is shown as thickened to accommodate the port 15.

In the modification shown in Fig. 4, the wall is thickened as at 22 and bored as indicated in dotted lines to fit it for use as a steam or water inlet, and the pipe 16 and its fittings, shown in Fig. 3, are omitted.

In general the mode of operation of the described mechanism is correctly set forth in said patent and in that connection the addition of dry steam from the generator 12 into the interior of the chamber 9 where it mingles with the dry gas improves the combustion and power of the engine and brings low fuel oils up to a high and efficient combination. In other words, the fuel is made readily ignitible when dry steam is mixed with it in the manner described. The suction of the engine draws some air through the vents 13 and also draws dry steam from the generator 12 into the chamber 9. It may be remarked that the port 15 serves as a means for introducing light oil as by pipe 16$^b$ to prime the engine, as in starting, because when the engine is starting steam is not generated in the generator 12. The wall 11 divides the exhaust gases and promotes a perfect circulation and proper distribution of heat more particularly in respect to the steam generator 12. The wall also adds strength and constitutes a means for delivering heat to the chamber 9. Additionally the wall affords convenient means for making ports through which communication can be had with the interior of the chamber 9.

What I claim is:

1. In an internal combustion engine and in combination with the cylinders thereof, a carbureter, an elongated chamber communicating with the carbureter and with the inlet ports of the cylinder, an exhaust compartment closed at its top and within which the entire chamber is inclosed and which receives the exhaust gases from the engine at a plurality of ports distributed along the chamber, there being space all around the chamber and between it and the compartment for the circulation of exhaust to avoid cold chamber walls, a wall depending from the closed top of the compartment and sub-dividing the upper part of the space between the outside of the chamber and the inside of the compartment, a steam generator arranged at the closed top of the compartment, and means for introducing steam from the generator into the chamber, substantially as described.

2. In an internal combustion engine and in combination with the cylinders thereof, a carbureter, an elongated chamber communicating with the carbureter and with the inlet ports of the cylinder, an exhaust compartment closed at its top and within which the entire chamber is inclosed and which receives the exhaust gases from the engine at a plurality of ports distributed along the chamber, there being space all around the chamber and between it and the compartment for the circulation of exhaust to avoid cold chamber walls, a ported wall depending from the closed top of the compartment and sub-dividing the upper part of the space between the outside of the chamber and the inside of the compartment, a steam generator arranged at the closed top of the compartment, and a connection from the steam generator through the ported wall to the interior of the chamber, substantially as described.

3. In a device of the class described the combination of a wall inclosing an elongated intake chamber, a second wall spaced from and independent of the first wall and inclosing an exhaust compartment closed at its top, the space between said walls permitting access for hot exhaust to the entire surface of the intake chamber, a third wall depending from the closed top of the compartment and sub-dividing the upper part of the space between the chamber and compartment, a steam generator arranged on the wall at the closed top of the compartment, and means for introducing steam from the generator into the upper part of the chamber, substantially as described.

HAROLD E. MONTAGUE.